United States Patent [19]

Reynolds et al.

[11] Patent Number: 6,033,608
[45] Date of Patent: Mar. 7, 2000

[54] METHOD FOR MAKING FOAM RUBBER TREE BARK-CONFIGURED ARTICLES HAVING MANMADE TEXTILES BACKINGS

[75] Inventors: Bennie H. Reynolds, Union; Riley Samuel Whitt, Jr., Spartanburg, both of S.C.; Robert C. Kerr; Amy Katherine Bowlin, both of LaGrange, Ga.

[73] Assignee: Milliken & Company, Spartanburg, S.C.

[21] Appl. No.: 09/038,857

[22] Filed: Mar. 11, 1998

[51] Int. Cl.[7] .................................................. B29D 67/00
[52] U.S. Cl. ............................ 264/54; 264/46.4; 264/257; 428/308.4; 428/18; 428/919; 442/221
[58] Field of Search .......................... 428/18, 17, 15, 428/919, 314.4, 317.9; 442/221; 264/45.1, 48, 54, 46.4, 257

[56] References Cited

U.S. PATENT DOCUMENTS

| | | | |
|---|---|---|---|
| Re. 31,696 | 10/1984 | Thorsrud | 521/88 |
| 437,431 | 9/1890 | Goodale . | |
| 657,050 | 8/1900 | Bick et al. . | |
| 2,218,740 | 10/1940 | Burke | 41/24 |
| 2,779,058 | 1/1957 | Hyde | 18/27 |
| 2,992,503 | 7/1961 | Webb | 43/1 |
| 3,377,249 | 4/1968 | Marco | 8/115.6 |
| 3,540,835 | 11/1970 | Marco | 8/115.6 |
| 3,563,795 | 2/1971 | Williams | 117/139.4 |
| 3,574,620 | 4/1971 | Tesoro | 117/62.1 |
| 3,598,641 | 8/1971 | Miller et al. | 117/138.8 E |
| 3,620,826 | 11/1971 | Machell | 117/139.5 C |
| 3,625,754 | 12/1971 | Dunn | 117/138.8 F |
| 3,632,420 | 1/1972 | Kuhn | 117/138.8 F |
| 3,649,165 | 3/1972 | Cotton | 8/115.5 |
| 3,650,801 | 3/1972 | Hinton, Jr. et al. | 117/47 A |
| 3,652,212 | 3/1972 | Machell | 8/115.5 |
| 3,660,010 | 5/1972 | Georgoudis et al. | 8/115.6 |
| 3,676,052 | 7/1972 | Harper, Jr. et al. | 8/115.6 |
| 3,690,942 | 9/1972 | Vandermass et al. | 117/138.8 F |
| 3,897,206 | 7/1975 | Kearney | 8/120 |
| 3,981,807 | 9/1976 | Raynolds | 252/8.8 |
| 3,989,790 | 11/1976 | Bruner et al. | 264/225 |
| 4,014,857 | 3/1977 | Schmoyer | 260/67.6 R |
| 4,068,035 | 1/1978 | Violland et al. | 428/279 |
| 4,073,993 | 2/1978 | Lark | 428/261 |
| 4,090,844 | 5/1978 | Rowland | 8/120 |
| 4,106,233 | 8/1978 | Horowitz | 47/44 |
| 4,131,550 | 12/1978 | Marco | 252/8.6 |
| 4,164,392 | 8/1979 | Hauser et al. | 8/18 R |
| 4,168,954 | 9/1979 | Marco | 8/18 R |
| 4,207,071 | 6/1980 | Lipowitz et al. | 8/115.6 |
| 4,290,765 | 9/1981 | Sandler | 8/115.6 |
| 4,427,557 | 1/1984 | Stockburger | 252/8.7 |
| 4,551,297 | 5/1985 | Bötcher et al. | 264/224 |
| 4,792,471 | 12/1988 | Lee | 428/17 |
| 4,902,465 | 2/1990 | Kerr et al. | 264/257 |
| 4,937,277 | 6/1990 | O'Lenick, Jr. | 524/318 |
| 5,227,214 | 7/1993 | Kerr et al. | 428/95 |
| 5,271,888 | 12/1993 | Sinsley | 264/87 |
| 5,445,863 | 8/1995 | Slagle et al. | 428/156 |
| 5,677,017 | 10/1997 | Freeman | 428/17 |
| 5,679,189 | 10/1997 | Jarboe | 156/61 |

FOREIGN PATENT DOCUMENTS

| | | |
|---|---|---|
| 57-53312 | 3/1982 | Japan . |
| 1-285314 | 11/1989 | Japan . |
| 5-124050 | 5/1993 | Japan . |

*Primary Examiner*—Terrel Morris
*Assistant Examiner*—Cheryl Juska
*Attorney, Agent, or Firm*—Terry T. Moyer; William S. Parks

[57] ABSTRACT

A process for the production of a foam rubber tree bark-configured article having a manmade textile backing is provided. The inventive process involves the vulcanization of NBR or SBR including a chemical blowing agent, and optionally including EPDM as an ozone-resistance agent, over a silicon-base mold which is a negative relief mold of at least a portion of tree bark, and with a backing adhered to, and not easily removed from, the unmolded side of the rubber. Such a backing is either 100% polyester or 100% nylon, which provides an excellent, long-lasting, durable, easily colored, fast-drying article for use in outdoor camouflage applications. The article itself, as well as clothing, footwear, and shelter articles incorporating the inventive product, are also provided.

9 Claims, 1 Drawing Sheet

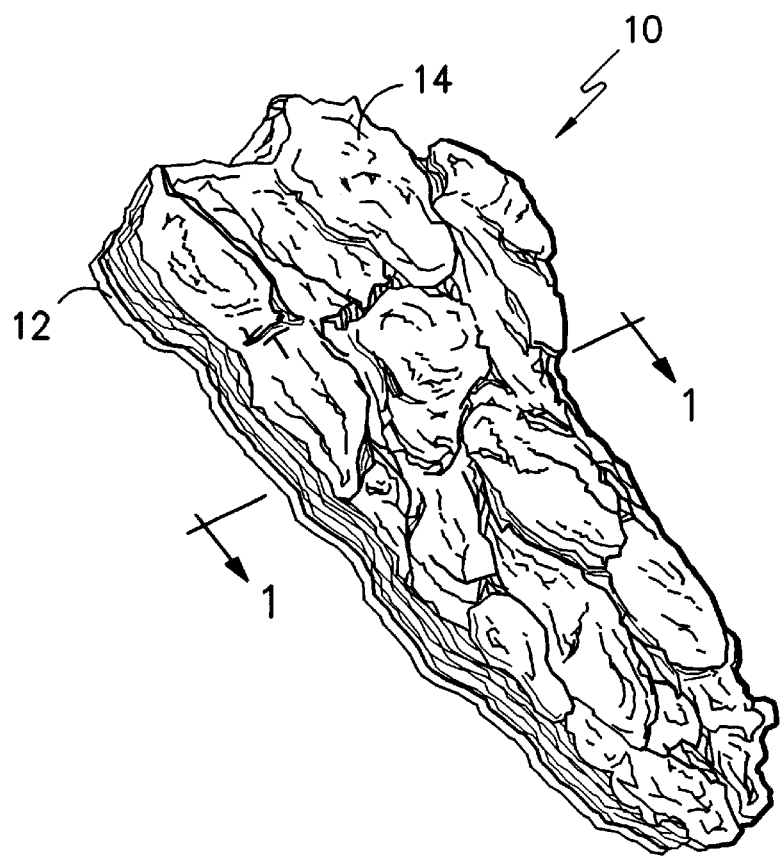
*FIG. —1—*
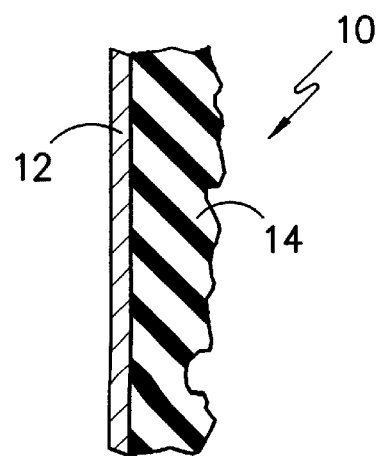
*FIG. —2—*

METHOD FOR MAKING FOAM RUBBER TREE BARK-CONFIGURED ARTICLES HAVING MANMADE TEXTILES BACKINGS

FIELD OF THE INVENTION

This invention relates to camouflage material having the appearance of tree bark and which has a lighter weight coupled with improved durability, particularly when exposed to a outdoor environment, over the prior art. Such material comprises a foam rubber tree bark-configured portion which is adhered to a manmade textile backing portion, preferably polyester or nylon. The particular articles are also contemplated within this invention.

DISCUSSION OF THE PRIOR ART

Camouflage material can be utilized in a variety of ways. Foremost is as a covering, either on a person's body or on a sheltering structure, for hunting purposes. Another instance is in military exercises in which concealment in wooded areas is necessary. Such material generally requires some sort of pattern which matches those of the subject environment. In this manner, the camouflaged object blends in with the subject environment or surroundings to prevent easy detection by game or by an enemy. Past camouflage products included apparel with specific patterns dyed or colored on the fabric or coverings for constructed buildings or for vehicles of the same type of dyed or colored patterns on textiles. Very few instances of three-dimensional articles have been disclosed.

Of those types of articles, the most noteworthy is disclosed within U.S. Pat. No. 5,677,017, to Freeman, entirely incorporated herein by reference. Patentee teaches a hardened liquid rubber tree-bark shaped article which may have a textile backing comprising no particular type of fabric. Such an article obtains its tree bark-configuration from a negative relief "Bondo"®-type mold obtained from the impression of the bark from a natural tree and may or may not include a textile backing. Again, and of great importance, patentee never specifies any type of textile backing for his inventive material. However, the use of any type of textile is not suitable, particularly in the harsh environments such camouflage articles must withstand. Furthermore, the rubber utilized within this patent does not include a blowing agent and thus cannot be of the foam type. Solid rubber has a much higher density than a foam rubber and thus is much heavier for a wearer. Solid rubber articles thus may subject a wearer to impaired degrees in movement when free mobility is imperative.

Other three-dimensional camouflage materials include those taught within U.S. Pat. No. 4,792,471, to Lee, and U.S. Pat. No. 4,517,230, to Crawford. Both of these references disclose the attachment of foliage to clothing or structural or vehicular coverings in order to provide a certain degree of camouflage. The necessary amount of foliage to provide sufficient camouflage would, again, create a serious lack of mobility for a wearer.

Thus, there still remains a need to develop a three-dimensional rubber tree bark-configured camouflage article which provides increased mobility and long-lasting durability to a wearer or a user.

DESCRIPTION OF THE INVENTION

It is thus an object of the invention to provide such an improved, long-lasting durable rubber camouflage article. A further object of the invention is to provide a relatively inexpensive method of making such an article. Another object of the invention is to provide a textile backing which provides sufficient safety from the elements as well as from certain florae and faunae, in particular venomous snakes. Yet another object of this invention is to provide coverings within all intended uses in which a user requires or desires a three-dimensional camouflage article.

Accordingly, this invention concerns a method of forming a tree bark-configured rubber article having a manmade textile backing comprising the sequential steps of (a) providing a rubber composition comprising
    at least one rubber selected from the group consisting essentially of acrylonitrile-butadiene rubber (NBR), styrene-butadiene rubber (SBR), and mixtures thereof;
    at least one nitrogen-containing blowing agent;
    optionally, an ozone-resistance agent being ethylene-propylene-diene rubber (EPDM); and
    optionally, at least one other additive selected from the group consisting essentially of an antistatic agent, a perfume, a scent, a colorant, a dye, a pigment, and mixtures thereof;

(b) placing said rubber composition over a silicon-based mold, wherein
    said mold is a relief of at least a portion of the bark of a tree;

(c) placing at least one layer of a textile of sufficient size to cover at least a portion of said rubber composition, wherein
    said textile is selected from the group consisting essentially of 100% polyester and 100% nylon;

(d) vulcanizing the textile-covered rubber composition within the silicon-based mold under a pressure, at a temperature, and for a period of time sufficient to effectuate a closed cell structure within the resultant vulcanized foam rubber and to effectuate adhesion between the textile backing and the rubber composition; and (e) removing the resultant vulcanized, textile-backed article from the silicon-based mold; and (f) optionally,
    (i) contacting at least a portion of the rubber side of said resultant article with at least one additive selected from the group consisting essentially of an antistatic agent, a perfume, a scent, a colorant, a dye, a pigment, and mixtures thereof;
    (ii) contacting at least a portion of the textile backing of said resultant article with at least one additive selected from the group consisting essentially of dyes, colorants, pigments, ultra violet absorbers, softening agents, and soil release agents; or
    (iii) both (i) and (ii).

Nowhere within the prior art has such a specific method utilizing a foam rubber and either 100% polyester or 100% nylon as a textile backing been disclosed or practiced. Furthermore, nor has such a specific manmade textile-backed foam rubber tree bark-configured article been taught or fairly suggested. Such manmade textile backings provide a significant advantage over natural fibers or manmade/natural blends fabrics. For instance, polyester or nylon provides excellent substrate adhesion to the rubber component of the inventive article. Fibers such as cotton or poly/cotton blends will adhere but, since the cotton is natural, it easily degrades and decomposes upon exposure to rain, wind, and the like, resulting in a product wherein the rubber eventually becomes separated from the backing. The polyester or nylon backings of this invention do not easily delaminate from the rubber. Also, these manmade fibers dry easily and efficiently after exposure to moisture thus providing, merely as examples, a more comfortable apparel article or a lighter object for application to shelter. Additionally, the manmade fibers are able to withstand the temperatures associated with vulcanization in order to both form the foam rubber product and adhere the textile substrate to the back of the vulcanized rubber. Backings comprised of natural fibers or natural/manmade blends do not withstand such harsh treatment as well as those specified in this invention. Finally, the particularly preferred types of backings provide aesthetic colors and textures for rubber camouflage backings in comparison to natural or natural/manmade fiber blend fabrics backings.

Preferably, the 100% polyester is a woven fabric made from polyethylene terephthalate yarn, the entire fabric having a weight of between about 6.5 to about 8.0 ounces per square yard. One particular type of 100% polyester substrate preferred is marketed under the name Worsterlon® from Milliken & Company. Preferably, also the 100% nylon is a woven fabric having a nylon-6 or nylon-6,6 yarn weight of from about 7.0 to about 8.0 ounces per square yard and a denier of from about 900 to about 1100. In particular, the preferred nylon backing is a woven substrate consisting of nylon fibers available from DuPont under the tradename of Cordura™. This type of nylon substrate shows very good results as a fabric backing for a foam rubber specifically for incorporation as a camouflage application on nylon fiber-containing snake-proof boots and clothing. The Cordura™-fiber fabric appears to provide good stability and adherence to particular nylon fibers and leather articles utilized in such applications. Such nylon fibers and leather articles integrated within snake-proof boots and/or clothing are very strong and are configured in such a way as to provide extremely good protection from the potential penetration of the fangs of venomous snakes.

The preferred rubber component is either acrylonitrile-butadiene (NBR) or styrene butadiene (SBR), or a mixture of the two types of rubber. These two types provide a very durable product upon vulcanization and also provide a particularly ozone-resistant article upon admixture with ethylene-propylene diene rubber (EPDM) as an ozone-resistance agent. Also possible within this invention are hydrogenated NBR and carboxylated SBR; however, the costs for these two excellent types of rubber may be cost prohibitive. Raw NBR is believed to be available from Miles Chemical Co. of Akron, Ohio, and SBR may be purchased from Goodyear Tire and Rubber Company of Akron, Ohio. The ozone-resistance agent EPDM, which is available from Exxon Corp. under the tradename of Vistalon™, is an optional additive to the inventive article; however, under outdoor conditions which facilitate degradation of the preferred rubber components, such a specific compound may be necessary. This compound, when desired, is added in a weight ratio range, in comparison with the rubber ingredient, from about 1.2 to about 9 (about 55 parts NBR or SBR and about 45 parts EPDM, to about 90 parts NBR or SBR and about 10 parts EPDM), preferably from about 2.3 to about 9. Such an additive gives a Bayer ozone cracking incidence factor of less than about 4, and preferably less than about 3. The addition of the ozone-resistance compound to the base rubber composition including a chemical blowing agent may be accomplished through a preferred fluxing process. Basically, this process involves combining these components within a standard rubber internal mixer, such as a Banbury® mixer which is well known to those of ordinary skill in the art. The NBR or SBR is mixed with the EPDM ozone-resistance agent at an operating temperature of from about 280° F. to about 300° F. The rubber mixture is then calendared into a solid rubber sheet of unvulcanized material (green rubber) which is tacky, as further discussed below, and permits slight adherence of the manmade textile backing prior to vulcanization. A specifically preferred method of making the rubber component of the inventive article is more particularly described in U.S. Patent application Ser. No. unknown (due to a recent refiling), descendant application of Ser. No. 08/637,586, to Kerr. Furthermore, standard, well known, stabilizers, plasticizers, and other rubber additives, may be introduced within the rubber composition to aid in processing.

As noted above, a chemical blowing agent is added to the rubber composition in order to form ultimately a foamed rubber product upon vulcanization having a two-phase (solid/gas) closed cell formation. This blowing agent may be of any standard type, however, preferred are those which are nitrogen compound organic type agents. Of this class are included, without limitation, and merely as examples, azodicarbonamide (Celogen™ AZ-type) available from Uniroyal Chemical Inc. in Middlebury, Conn., and modified azocarbonamide, available from Miles Chemical of Akron, Ohio under the tradename Porofor™ ADC-K. It is this compound which provides a foam rubber article and thus a product having a specific gravity lower than a solid rubber. Such a specific gravity is thus less than about 0.98 and preferably from between 0.5 and 0.98. Furthermore, the rubber expands upon vulcanization preferably from about 50 to about 200 percent the size of the green, unvulcanized rubber; however, lower and higher expansion factors are also possible.

After premixing and prior to vulcanization, the rubber composition is tacky. At that point, the polyester or nylon backing is then placed upon and slightly adhered to the rubber. The rubber is then placed over a silicon-based mold having a negative relief image of, for example, the trunk of a pine tree. Such a mold is formed by taking, as merely an example, a trunk of a pine tree and covering a portion of the trunk with a Bondo® composition (a plastic auto body filler material available from Dynatron/Bondo Corporation of Atlanta, Ga.). Any other method of forming a relief mold for ultimately providing a tree bark-configuration, such as, without limitation, with a grout application, is also contemplated, as is any other type of tree (such as oak, cedar, and the like), and other part of a tree (such as a branch, and the like). The Bondo® composition then adheres to the trunk surface into each crevice, etc., of the subject trunk, thereby forming, upon drying, an exact relief of the tree trunk surface. A silicon mold is then formed by pouring silicon over the outside of the hardened Bondo® material, or any other mold-producing article, tree trunk representation and allowing that silicon formulation to harden. Such a silicon-based mold can withstand the harsh temperatures (from about 225° to about 350° F.) and pressures (from about 20 to about 40 psi) associated with vulcanization and has the same composition, but not the same configuration, as the cleat-producing silicon mats in U.S. Pat. No. 5,227,214, to Kerr et al. Upon vulcanization, then, the side of the rubber in contact with the silicon mold takes the shape of the mold and has a tree bark-like appearance. The other side of the rubber in contact with the textile backing remains substantially, though not necessarily, smooth and becomes laminated to, and thus extremely difficult to remove from, the fabric.

Again, prior to vulcanization, any standard rubber additives, including ultraviolet absorbers, dyes, colorants, perfumes, antistatic agents, and the like may be added. Furthermore, after the vulcanization step, such additives may also be added to the rubber component. During the vulcanizing process it may be difficult for certain desired compounds to withstand the high temperatures without flashing off or degrading. Thus, the introduction of such compounds post-vulcanization is permitted. Preferably, the rubber is dyed any camouflage color and impregnated with a hunt-enhancing scent or aroma after vulcanization.

To the laminated fabric backing may be added, after vulcanization also, any other standard textile additives, such as dyes, colorants, pigments, ultra violet absorbers, softening agents, and soil release agents. Particularly desired as optional finishes to the inventive fabrics are soil release agents which improve the wettability and washability of the fabric. Preferred soil release agents include those which provide hydrophilicity to the surface of polyester. With such a modified surface, again, the fabric imparts improved comfort to a wearer by wicking moisture. The preferred soil release agents contemplated within this invention may be found in U.S. Pat. Nos. 3,377,249; 3,535,151; 3,540,835; 3,563,795; 3,574,620; 3,598,641; 3,620,826; 3,632,420; 3,649,165; 3,650,801; 3,652,212; 3,660,010; 3,676,052; 3,690,942; 3,897,206; 3,981,807; 3,625,754; 4,014,857; 4,073,993; 4,090,844; 4,131,550; 4,164,392; 4,168,954; 4,207,071; 4,290,765; 4,068,035; 4,427,557; and 4,937,277. These patents are accordingly incorporated herein by reference.

The inventive article is then contacted to the subject substrate (clothing, boots, shelter, and the like, as merely examples) through any means which provides sufficient adhesion for permanent, or semi-permanent application. As merely examples, the inventive article may be glued on the subject substrate (with an epoxy compound, as one example) or sewed on the subject substrate. Furthermore, a Velcro®, or similar type of, system may also be attached to the fabric in order to facilitate application and removal of the inventive camouflage article from apparel, shelters, boots, and the like, if so desired. Again, these methods are merely suggestions as myriad methods of such adhesion would be well within the purview of one of ordinary skill in the art.

The inventive camouflage article may be added to garments, shelters, boots, and the like, or utilized as fake trees or for any other purpose in which a tree-bark appearance is desired, for instance, those applications described in U.S. Pat. No. 5,677,017, to Freeman, as previously herein incorporated above.

BRIEF DESCRIPTION OF THE DRAWINGS

FIG. 1 is a perspective view of a portion of camouflage material according to the preferred embodiment of the invention.

FIG. 2 is a cross-sectional view of a portion of camouflage material as illustrated in FIG. 1 taken through line 1—1 thereof, according to the preferred embodiment of the invention.

DETAILED DESCRIPTION OF THE DRAWINGS

In FIG. 1, a molded portion of the NBR- and/or SBR-containing foam rubber composition 10 provides an exact replica of the bark of a tree 14. The opposite side of this rubber 12 is substantially smooth and is entirely covered by a textile backing comprising either 100% polyester or 100% nylon. As noted previously, the 100% polyester backing is preferably made from Worsterlon® and the 100% nylon backing is preferably made from Cordura™ fibers. FIG. 2 exemplifies the irregular tree bark pattern of the molded foam rubber composition 10 and the substantially smooth opposite textile-backed surface 12. Optionally, and, at times, preferably, the rubber composition comprises an ozone-resistance agent, EPDM, and, also optionally and, at times, preferably, either or both the rubber composition and the textile backing comprise additives including dyes, colorants, perfumes, and the like. More particular additives have been discussed previously. The molded foam rubber portion of the article 10 is preferably formed by placing a green rubber composition (comprising either NBR or SBR or both and a chemical blowing agent), in a solid sheet, on a silicon-base mold (which can withstand high temperatures and pressures and is easily removed after vulcanization) which is formed in the shape of a negative relief of the bark of a tree. To the rubber composition is lightly adhered the textile backing 12. The silicon-base mold is laid upon and in direct contact with a surface, preferably a teflon®-coated conveyor belt, with the rubber in direct contact with the mold and the textile in direct contact with the rubber. The entire article is then subjected to a vulcanization process during which the rubber in direct contact with the mold permanently takes the shape of the relief, and the textile backing becomes permanently adhered to the opposite side of the now vulcanized foam rubber sheet. The resultant article thus comprises the molded portion 10 and the substantially smooth textile backing portion 12.

There are, of course, many alternative embodiments and modifications of the present invention which are intended to be included within the spirit and scope of the following claims.

What we claim is:

1. A method of forming a tree bark-configured rubber article having a manmade textile backing comprising the sequential steps of (a) providing a rubber composition comprising
at least one rubber selected from the group consisting of acrylonitrile-butadiene rubber (NBR), styrene-butadiene rubber (SBR), and mixtures thereof;
at least one nitrogen-containing blowing agent;
optionally, an ozone-resistance agent being ethylene-propylene-diene (EPDM); and
optionally, at least one other additive selected from the group consisting of an antistatic agent, a perfume, a scent, a colorant, a dye, a pigment, and mixtures thereof;

(b) placing said rubber composition over a silicon-based mold, wherein said mold is a relief of at least a portion of the bark of a tree;

(c) placing at least one layer of a textile of sufficient size to cover at least a portion of said rubber composition, wherein
said textile is selected from the group consisting of 100% polyester and 100% nylon;

(d) vulcanizing the textile-covered rubber composition within the silicon-based mold under a pressure, at a temperature, and for a period of time sufficient to effectuate a closed cell structure within the resultant vulcanized foam rubber and to effectuate adhesion between the textile backing and the rubber composition;

(e) removing the resultant vulcanized, textile-backed article from the silicon-based mold; and (f) optionally,
(i) contacting at least a portion of the rubber side of said resultant article with at least one additive selected from the group consisting of an antistatic agent, a perfume, a scent, a dye, a pigment, and mixtures thereof;

(ii) contacting at least a portion of the textile backing of said resultant article with at least one additive selected from the group consisting of a dye, a colorant, a pigment, an ultraviolet absorber, a softening agent, a soil release agent, and mixtures thereof; or (iii) both (i) and (ii).

2. The method of claim 1 wherein the textile backing is 100% polyester.

3. The method of claim 1 wherein the textile backing is 100% nylon.

4. The method of claim 1 wherein the ozone-resistance agent within step (a) is present.

5. The method of claim 4 wherein the weight ratio of the rubber to EPDM is from about 1.2 to about 9.0.

6. The method of claim 5 wherein the weight ratio of the rubber to EPDM is from about 2.3 to about 9.0.

7. An article of clothing comprising an article produced by the method of claim 1.

8. An article of footwear comprising an article produced by the method of claim 1.

9. A shelter covering comprising an article produced by the method of claim 1.

* * * * *